Nov. 30, 1948.  F. A. SLACK, JR  2,454,847
MOLD, MOLD CHARGING, AND MOLDING PROCESS
Filed April 29, 1944  3 Sheets-Sheet 2

Inventor:
Fred A. Slack, Jr.
By Bair, Borden & Fox
Attorney.

Nov. 30, 1948.  F. A. SLACK, JR  2,454,847
MOLD, MOLD CHARGING, AND MOLDING PROCESS
Filed April 29, 1944  3 Sheets-Sheet 3

Inventor:
Fred A. Slack, Jr.,
By Bair, Borden & Fox
Attorney

UNITED STATES PATENT OFFICE 2,454,847

MOLD, MOLD CHARGING, AND MOLDING PROCESS

Fred A. Slack, Jr., Penn Valley, Pa., assignor to H. D. Justi & Son, Inc., Philadelphia, Pa., a corporation of Pennsylvania Application April 29, 1944, Serial No. 533,298

25 Claims. (Cl. 18—34.1)

1

This invention relates to molds, mold charging and molding processes, pertaining particularly to the production of articles such as artificial teeth having at least two physically or visually contrasting portions.

Although molding is an art of great antiquity yet it has taken on added impetus and importance pursuant to the development of thermo-setting and thermo-plastic compounds. These materials have led through various forms of molding to the present economical and high speed forms of molding, represented by compression, extrusion, injection and transfer molding and combinations of or developments of same, which have effected radical changes in molding techniques. It is noteworthy however, that all such improved forms of molding have been available only for the use of a single homogeneous charge for the production of a single homogeneous mass having the same uniform internal as well as superficial characteristics and the same uniform visual aspect as the result of a physical and visual uniform structure throughout the molded mass. So far as known all such high speed molding has concerned itself solely with imparting shape and dimensions to a uniform molded mass. When the article becomes more complicated and has one portion of an accurately predetermined shape or area having one visual aspect or physical structure, while another portion of the entity has another accurately predetermined shape or area having a different contrasting visual aspect or physical structure, such as is presented, for purely illustrative example by an artificial tooth, a problem is presented which the known modern molding methods cannot solve. In short, whenever two or more different batches or lots of moldable material are to be joined in carefully predetermined relative proportions and accurately predetermined relative shapes into an integral molded unit, none of the presently known high speed molds, or mold charging or molding processes are either available for or capable of such molding. This is true so far as known, whether the difference between the illustrative two lots, batches or charges of material comprises a mere subtle difference of shading or hue, or a difference between the degrees of brightness or saturation or shading of the same hue, or whether it is a difference in texture, density, physical characteristics, a difference in materials themselves, or even a difference between the initial physical states of the different lots or batches such as to whether they are respectively fluids, or solids, or mixtures thereof.

2

Artificial teeth as previously developed were made of clays, different lots of which were provided with varying proportions or amounts of modifying materials such as opacifiers, pigments and the like, establishing a plurality of at least two relatively different lots, batches or charges of material, which respectively required very accurate relative shaping and proportioning in the molds to establish the necessary visual effects in the finished tooth. However, despite years of effort, no really efficient molds, or charging or molding processes were developed to facilitate such molding. Certainly nothing was developed in the art of porcelain tooth manufacture that could be successfully used in the production of plastic artificial teeth, although the problems in ultimate visual aspect of the completed artificial teeth, regardless of the materials from which they are made, are practically identical. Thus in any artificial tooth, in a simple illustrative form thereof, it is essential to have an incisal tip of relatively translucent material which is also prolonged across the entire or almost the entire labial surface of the tooth, which in a given tooth requires usually one material of known characteristics to be handled. It is also essential to have at least a second material of known characteristics so as to represent enamel, extending partially toward but spaced from the incisal tip while overlying and backing up the translucent material of the labial surface and usually forming part at least of the lingual tooth surface and this is or may be accompanied by still a third material of known characteristics merging into but visually contrasted with the enamel and forming the body and root of the tooth. Sometimes further additional intermediate charges of material are used to assist blending but in every case of teeth for mounting in a denture there are at least two different charges. In the formation of porcelain teeth the various clays and mixtures were respectively required to be moistened into a plastic or malleable mass which was relatively form-retaining, which could then be shaped and proportioned and initially fired to produce a bisque, appreciably larger than the ultimate porcelain artificial tooth completed by a second prolonged high temperature firing. Such molding methods for porcelain teeth involved the use of a multi-part mold having complemental recesses, which, when joined, formed the individual closed mold cavities in which the bisques were formed.

In this illustrative form of prior art practices, commercial success was always qualified or conditioned by the necessity for the use of and complete reliance upon manual skill and dexterity of the operators.

The operator, with the mold portions separated, was required to make a mental estimate of the approximate amount of incisal material necessary for a given mold cavity while it existed as a pair of complemental but detached mold recesses only. The operator, in furtherance of the estimate usually removed an approximate amount from a supply pile and forced it into the open recess of one mold portion and then manually shaped it as best he could to both so dispose it in the mold recess as to cover at least part of the labial surface of the ultimate tooth, while also building it above the level of the recess in a thickness as great as he believed would just permit the incisal portion to be engaged and finally shaped by the complemental mold recess of the other mold part when subsequently assembled. This initial charging and shaping of the first malleable mass was then followed by, at least, a second estimate as to volume by which the operator removed a charge from a second batch and forced it into the open recess to overlie the material for the labial surface while also building it up in thickness so as to enable the second charge to be finally shaped by the complemental mold recess when the mold cavity was finally completed and closed. Similar estimates and shaping were required for additional charges, if any, disposed in the incomplete mold cavity, all as preliminary to the initial firing of the assembled mold and contents to form the clay bisque. As such highly skilled labor as is essential for such techniques and practices is scarce and expensive, so also the percentage of discards resulting from such purely manual skill is high, the production rate is low, the deterioration of molds is high because of abrasion, with an ultimate high cost of the porcelain teeth when completed. Note that by this molding process it is necessary to charge the entire mold cavity by successive stages of charging one half thereof only and shaping the charges successively in the lower half to properly fill the complete mold cavity when it is subsequently completed by juxtaposing the complemental mold recesses in the upper and lower mold halves to form the complete closed mold cavities.

It is probable that intimate knowledge of the art of porcelain tooth manufacture has interfered with the development of efficient molds, and charging and molding processes for the manufacture of plastic artificial teeth. At any rate so far as known none such have yet been evolved and present plastic tooth manufacture has continued to revolve about modifications of porcelain tooth molding techniques, with consequent unsatisfactory, expensive and variable products which all fall far short of the perfection that is attainable from and is achieved by the invention herein.

It is among the objects of this invention; to provide improvements in molds; to provide improvements in the art of charging molds; to provide improvements in the art of molding; to provide a molded plastic tooth of denseness and lifelike coloring and shadings and with each in uniformity with others of a series; to simulate a natural vital tooth in an artificial tooth made of a plastic; to provide molds and a charging and molding technique by which a series of plastic articles can be molded each possessed of at least two predetermined physically or visually contrasting portions; to cheapen the costs of molding; to reduce the costs of molds; to provide a mold such that successive charges of dry powder can be properly disposed in the mold cavities in any desired degree of mutual blending; to reduce the weight of molds for molding plastic articles; to reduce the labor involved in molding plastic articles; to provide a molding technique by which at will and selectively two visually contrasting colors or material can be associated in a molded article either with a sharp line of separation between contiguous charges or with a subtle blending so that one merges into the other without such sharp line; to reduce the amount of waste hitherto attaching to molds and molding processes; to provide improvements in molds and charging and molding processes by which wear on the mold parts is for all practical purposes precluded, with a consequent avoidance of the previously necessary frequent replacement of the mold parts; to provide a molding and charging process by which an infinite range of colors and shades can be imparted to a molded article; to provide a mold with a charging reservoir equidistant from all mold cavities; to provide a mold which can be charged by gravity; to provide a mold which can be charged centrifugally; to provide a mold which can be charged as a resultant of both gravity and centrifugal force; to provide a molding process for plastic articles in which a plurality of mold cavities are subjected to identical molding pressures to secure uniformity of the products; to provide a method and means for forming a succession of plastic teeth of uniform perfection; to provide improvements in molds and charging and molding methods which lend themselves to automatic actuation and functioning; to provide molds for plastic teeth of respectively different sizes the heating cycle of which is predeterminedly the same; to provide molds of generally cylindrical shape for uniformity of charging and molding the mold cavities; to eliminate moving parts in molds; to provide molds for forming a plurality of plastic articles which are readily stripped from the mold; to provide a mold and charging and molding processes by which a molded object may have only two contrasting portions and by which the object may also have practically an infinite number of contrasting portions according to the preference of the operator; to provide improvements in molds and charging and molding processes by which articles of a single uniform visual aspect can be produced with efficiency and economy; and many other objects and advantages will become more apparent as the description proceeds.

In carrying out the invention in a preferred but purely illustrative form a centrally charged two-piece mold is provided in which the mold cavities formed of complemental surfaces in the lower and upper mold pieces are substantially radially disposed in an annular series substantially concentric relative to a hopper or reservoir bore formed in the upper mold piece of the mold, and are respectively connected to the hopper or reservoir by substantially or generally radially extending sprue channels defined by surfaces of both the upper and lower mold members.

In charging the described mold, in intermittent or in preferred forms, a practically continuous but carefully metered stream of the plastic material, preferably in the form of dry powder, passes from a suitable feeding medium such as a tube, which may be adjustable in direction of discharge into the charging hopper or central reservoir, and thence into and through the sprue channels into the respective mold cavities until there is a solid column of powder extending from the incisal tip end of the respective mold cavities through the remainder of the mold cavities, the sprue channels, said into the hopper or reservoir. The powder passes from the delivery tube and reservoir into and is shaped and proportioned properly in the mold cavities either gravitationally or under the influence of centrifugal force, or a combination of both. The first powder delivered through the tube in charging is that, for instance which is to form the incisal tip of the molded tooth. After a metered amount has been directed into each mold cavity, the flowing stream of powder is changed from incisal tip material, to enamel material, for instance. This change may be either abrupt, as by stopping one flowing charging stream before beginning the next, or it may be very gradual indeed by overlapping supplies causing some portion of the flowing stream entering the hopper to be comprised of portions from both the incisal tip material and the enamel. In the usual course, with a flowing stream of abruptly changing charges, there may be enough change of direction and mutual tumbling and intermixture of the parts of two different charges as to cause very satisfactory blending of the respective spectral distributions of the two predeterminedly contrasting parts, or powders of various shades, or color combinations may be preliminarily prepared by preblending before simple feeding.

In molding, the completely charged assembled mold, with the powdered plastic in the continuous column from one end of each mold cavity to the filled central hopper, is then heated for a predetermined interval to change the consistency of the plastic powder into a column of more or less viscous mutually adherent particles capable of being forced into a solid whole under suitable pressure. The heated mold itself is then subjected to transverse pressure to resist separation of and minimize without necessarily completely precluding flash between the mold pieces during the maintenance of which pressure a piston is forced into the heated mass in the hopper, placing the mass and thus the column of materials in the sprue channels and mold cavities under such pressure as to unify and solidify the entire column without disturbing in any way the blending attaching to the mode of charging just recited, then while maintaining the pressure, the entire mold is permitted to cool, after which the mold pieces are separated, then the molded mass is stripped from whichever mold piece it may adhere to after separation of the mold, the molded teeth are cut from the sprues, and the finished teeth are finally treated to remove all flash, sprue and parting line indications.

In the accompanying drawings forming part of this description,

Fig. 13 represents diagrammatically an illustrative form of actuating device or means for securing relative motion of the piston and assembled mold, with an auxiliary means for securing transverse compression of the mold during the compressing actuation of the piston.

Before discussing the mold construction in detail, the molded article with the varying requirements thereof, as disclosed in Fig. 12, will first be discussed and the parts identified so that the explanation to follow will be more readily understood. Referring to this figure, therefor, a lower mold portion or piece 10 is provided containing the upwardly presenting recesses 11, and the upper mold piece 12 contains the downwardly presenting recesses 13 and the registering recesses define a complete closed mold cavity 14 the only opening into which aside from possible flash through the parting line 15 is the sprue channel 16. The mold cavity is first charged with a chosen lot of material preferably of more or less translucent nature, as at 17, which not only forms the incisal tip portion substantially symmetrically disposed on both sides of the parting line 15, but also, as shown at 18 lies along the surface of the lower recess 11 to form in part at least the labial surface of the finished tooth. To this end it will be understood that the disposition of the powder 17 and 18 so that it assumes the shape shown will preferably be accomplished by subjecting the powder to both centrifugal force moving toward the incisal tip, and also to the action of gravity urging the powder to cover the lower recess 11. The illustrative preliminary plastic assembly further comprises a charge of a contrasting material 20, comporting with the visual aspect of enamel of a vital tooth, and which may be more or less symmetrically disposed in the mold cavity 14 between the labial layer 18 of the incisal material 17, and the surface of recess 13. If found desirable still a third material in powdered form 21 may be provided of still further contrast to the incisal tip 17 as well as to enamel portion 20. It will be understood that after completion of the molding, the finished molded plastic tooth will have components occupying the same relative positions therein as those disclosed in the mold as a preliminary to actual molding.

Figure 1:
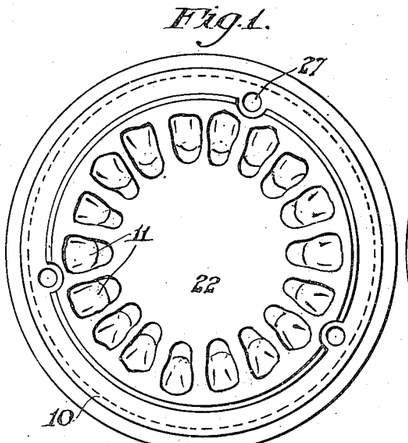
Fig. 1 represents a plan of a purely illustrative form of lower mold piece or mold half, according to this invention.
Figure 2:
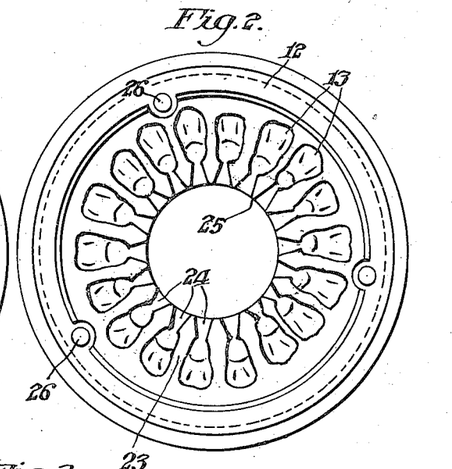
Fig. 2 represents a bottom or reflected plan of the upper half or mold piece complemental to that of Fig. 1, in a purely illustrative form.
Figure 3:
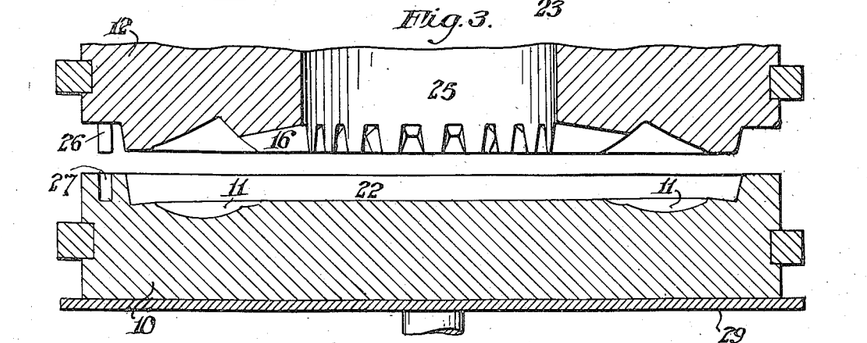
Fig. 3 represents a transverse section through the two cooperating complemental mold pieces of Figs. 1 and 2, in a separated position prior to assembly to define the complete mold cavities, sprue channels and hopper of the preferred form of the invention.

Referring now to the earlier figures, it will be seen that the mold comprises a lower preferably cylindrical piece 10, preferably made of metal both for longevity and for rapid heat conduction although any other material may be used. The lower mold piece 10 is provided in its upper surface 22 with a plurality of independent mold recesses 11 each extending generally radially of the center of the piece, and all being disposed in an annular series substantially concentric of the said center of the piece. The upper mold piece 12 has a plurality of the independent mold recesses 13 formed in its lower face 23, each extending generally radially of the center of the upper piece and also arranged in an annular series concentric with such center, and each respectively arranged for juxtaposition with a complemental lower recess 11. The upper cylindrical mold piece 12, preferably, in its lower surface 23 has a plurality of incomplete downwardly presenting channels 24 forming with the contiguous surface 22 of lower mold piece 10, the sprue channels 16, which extend generally radially of the upper mold piece in communication with the respective mold recesses 13 at one end and with a generally axially extending central bore 25, forming the hopper or reservoir for the assembled mold. This latter is of appreciable size so as to receive a large piston to be described and so as to permit a feeding tube to be adjusted angularly therein, as will also be described. It will be understood that the sprue channels can also be formed in the upwardly presenting face 22 of the lower piece 10, or they may be formed in both pieces for registration to complete the channels. An important feature lies in the utilization of mold cavities of different sizes or volumetric capacities, in connection with which it is preferred to vary the effective areas or widths of the associated sprue channels, so as to proportion the inflow of molding material to the mold cavity in which it is to be disposed.

It will be understood that suitable anchoring means, such as the pin and recess combinations shown at 26 and 27, respectively, will be provided, to prevent relative angular motion of the upper and lower cylindrical mold parts, and also suitable means such as axial recesses (not shown) will be provided if necessary to enable the assembled mold pieces to be anchored upon a spinnable table 29.

Figure 4:
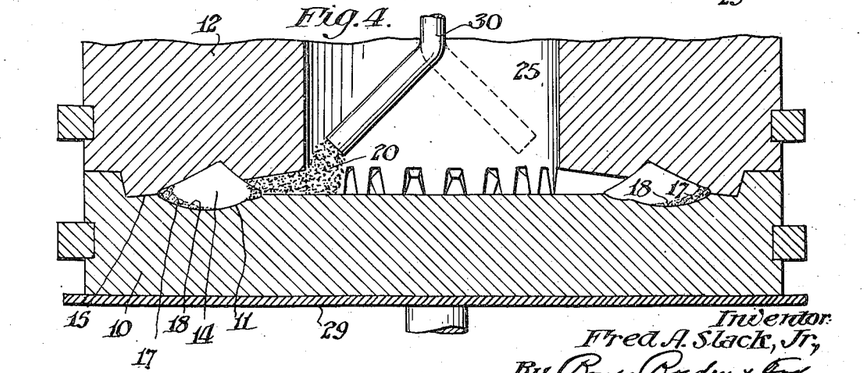
Fig. 4 represents a transverse section through the joined mold portions or pieces of Figs. 1 and 2, with a purely illustrative plastic-discharging tube in one operative position in the charging hopper of the assembled mold, with the mold unit shown, illustratively, as mounted on a turntable to develop centrifugal force to distribute the initial powdered plastic in the respective mold cavities.

In charging, the mold as thus described, in what may be designated as one desirable form, will be arranged for generally centrifugal charging of the mold cavities, with an attendant utilization of the force of gravity to secure a resultant force effective upon the powder charge. To this end the spinning table 29 will be susceptible to control and be selectively variable in its speed to secure the proper combinations or the proper line of resultant forces on the powder masses. With the mold on such table, the tube 30 will be disposed so that its upper end is in a feeding trough or first hopper or in communication with some source for delivering an amount of incisal material 17 that when properly distributed will just fill the incisal tip and provide for a covering of the labial surface of the teeth in all of the respective mold cavities 14. If the tube 30 delivers this amount to the charging hopper 25 adjacent to the inner ends of the sprue channels 16, spinning the table at a properly coordinated speed will cause the powder to be flung outwardly through the sprue channels into the respective mold cavities, in which latter it will be caused to assume the position indicated at 17 and 18 of Fig. 12. If thereafter, a second charge of the powder were carefully metered into the tube 30 to provide just enough enamel material to furnish enamel 20 to all of the mold cavities 14, it would be fed through the sprue channels 16 and be compacted against the material for the incisal tip 17, and against the extension 18 thereof, and if desired the rate of delivery of this material or the centrifugal force available upon it could be varied relative to that used on the material 17 if desired, so as to urge it to more or less symmetrical disposition in the mold cavity, according to the necessities of the particular case. If after the second charge has been disposed in the respective mold cavities in the manner just described, the tube was then supplied with a third charge, say of material 21, it will be clear that thereupon after delivery to the hopper reservoir 25, the mold cavity could be completely filled. Thereafter, by a continuation of material 21, or with care after the mold cavities were properly filled, with still another material, possibly comprising scrap or waste material or material discarded from other processes or techniques being practiced, the sprue channels 16 would be filled, and thereafter the hopper reservoir 25 would be filled, preferably, almost to the top, and the charging would then be complete.

Figure 5:
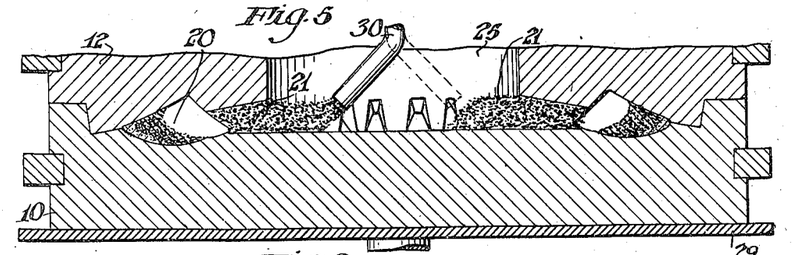
Fig. 5 represents a similar section with a material of the second of the series of charges discharged from the tube and illustratively disposed centrifugally, in the mold cavities in compacted relation to the initial lot or batch of powder.

It will be clear that with the step by step intermittent charging thus described, there would be both a careful proportioning and also a careful relative shaping of the components, but it will also be clear that under such charging circumstances the line of demarcation between contiguous charges will be abrupt. In some cases this may be preferred. However, in other cases a more subtle and delicate demarcation, marking by blending of one into the other, may be preferred, as it almost certainly will with teeth as the article molded. In this case it will be clear that there are several ways of accomplishing the result. For instance it will be clear that the delivery into the pipe or tube 30 may be progressively a shutting down of the first metered charge with a gradual beginning of the second metered charge, and so forth, so that there is a portion of the delivery which includes particles from both charges which forms the blending layer leading into the respective different materials. In the alternative, perhaps, would be the provision of additional pipes 30 so that in overlapping relation one, two or more pipes or tubes could be delivering their contents simultaneously to the charging hopper 25, for part of the charging operation.

In this preferred type of charging it will be clear that the tube can deliver its flowing stream of pulverulent material to the center of the hopper, or eccentrically thereof just at the hopper and mouth of the sprue channels. Preferably, as noted, the cross-sectional area or width of the respective sprue channels will vary to accord with the varying volumetric capacities of the respective associated mold cavities so as to properly proportion the inflow of shaded molding material to the respective mold cavities. A still further modification of the powder feeding tube 30 is having its main part concentrically arranged, but having its delivery mouth off-set therefrom within the hopper chamber 25, and arranged to be rotated, so that while delivering the main tube is rotated on an axis concentric with the mold, while the delivery mouth thereof delivers the flowing stream successively to the mouths of the respective sprue channels as they are passed in the relative rotation of the parts. It will be understood that in this form of discharge for the charging powder, tube 30 may be rotated, the mold may be rotated, or they may both rotate in opposite directions or differentially in the same direction.

Figures 10, 11, 12:
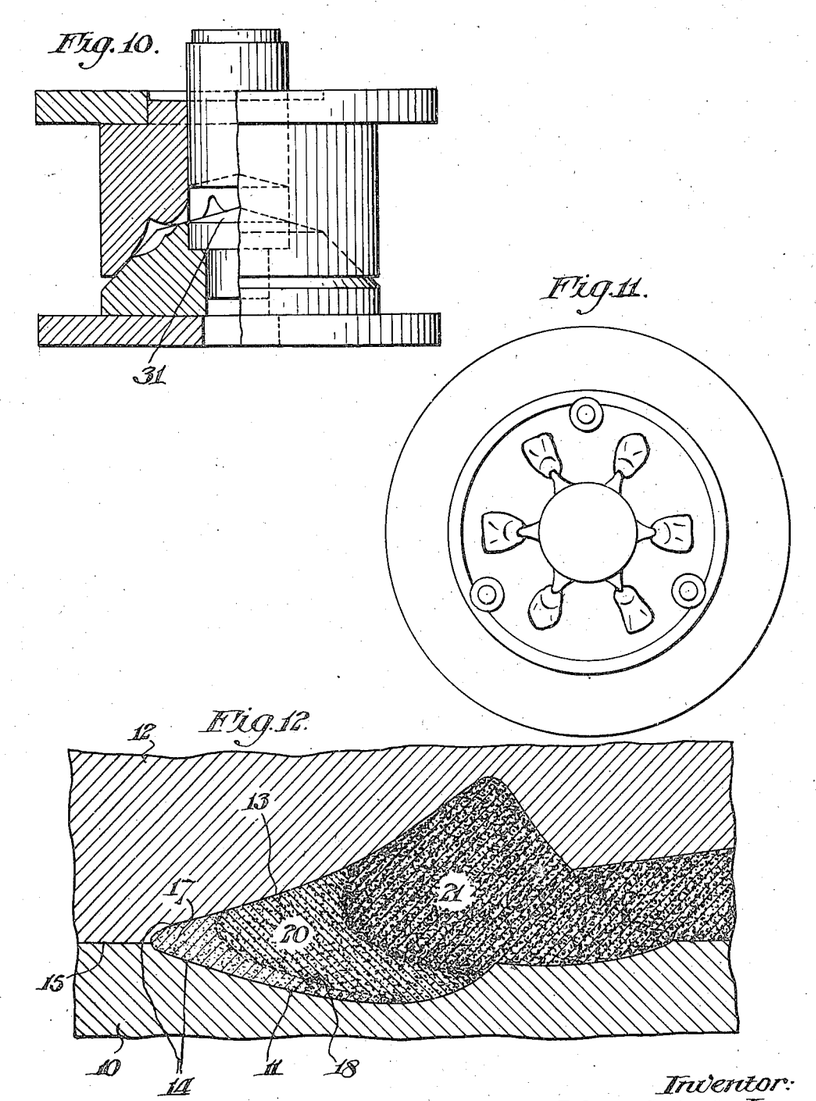
Fig. 10 represents a transverse section through a modified form of mold adapted for gravity charging.
Fig. 11 represents a plan of the operating face of the upper mold piece of Fig. 10.
Fig. 12 represents a fragmentary enlarged section on an exaggerated scale through the portions of the mold pieces defining a mold cavity and with the latter filled with three illustrative shades or charges of overlapping and contrasting materials, comprising the important divisions of materials in an illustrative form of tooth.

In the form of invention shown in Fig. 10, which in many cases may be preferred, the mold in all of its details is similar to that of the preferred form except that a cone 31 may be formed in the lower mold piece and the sprue channels and the mold cavities are at an angle to the horizontal so that delivery of the powder on the cone 31 enables purely gravitational feed into the respective mold cavities. In this form of invention it will be clear that the movable delivery tube will enable proper and uniform charging of the mold cavities. Again the sprue channels are preferably predetermined in width to admit the proper proportion of shaded charge according to mold cavity capacity.

In every case of charging it will be clear that the mold cavities are filled with a compact mass of powder with no appreciable voids other than those inherent in the use of the particular granules used.

Figure 6:
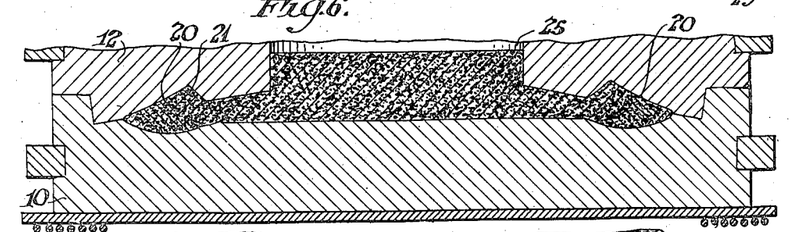
Fig. 6 represents a section of the assembled mold relatively completely filled with compacted plastic powder and being disposed on a heated plate in order to cause an initial plasticising or partial polymerization of the plastic in the mold cavities and central charging hopper.

The molding operation. With a given mold charged to the degree indicated in the preceding discussion, and with the hopper reservoir preferably almost completely filled, it is then subjected to heat in any desired manner to partially polymerize or plasticize the entire column of powder in the mold cavities, sprue channels and charging reservoir. This can be expeditiously accomplished by placing the assembled charged mold upon a suitably heated plate 39, (Fig. 6), or placed in a flame, or in an induction heater or the like, so that a given time cycle of heat is undertaken.

This timed heat exposure converts the dry powder into an extremely viscous deformable mass of the consistency perhaps of slowly workable putty assuming a molding material such as polymer of methyl methacrylate for a purely illustrative example. Obviously the entire mass from one end of the mold cavities through the sprue channels, and into the hopper is a uniform plastic inelastically deformable or compressible unit. The heating time is carefully arranged in accordance with the masses of metal to be considered as present in each mold, if this comprises the material of the mold pieces to the end that the heating cycle is substantially identical for all molds of a series.

Figure 7:
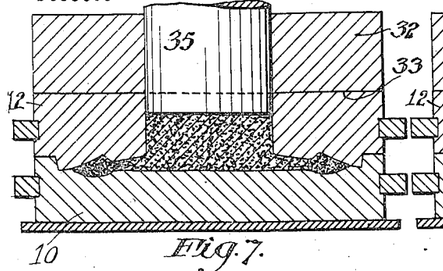
Fig. 7 represents a similar section through the same assembled mold pieces and plastic contents with a pressure plate and working piston to force and hold the mold pieces together to reduce flash, prior to and during piston actuation.
Figure 8:
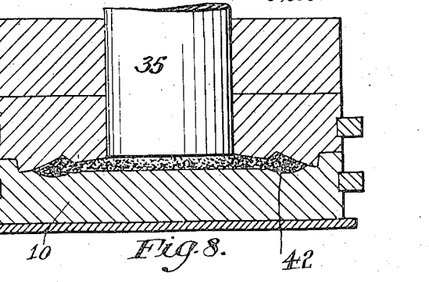
Fig. 8 represents a similar section to that of Fig. 7, with the working piston forced into the mass in the hopper of the mold, to exert compression force evenly throughout the plastic column and to insure that the cavities are evenly and densely filled with the rigidified and solidified plastic material.
Figure 9:
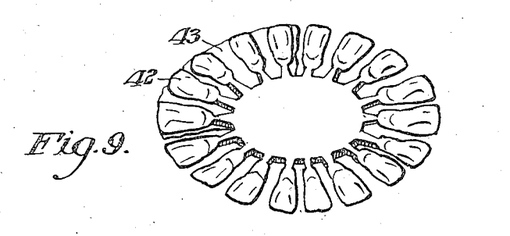
Fig. 9 represents an illustrative product of the molding process shown in perspective showing the small amount of waste associated with the products.

At the end of the heating cycle, which may comprise for instance five minutes, the heated mold is subjected to the action of the pressure plate 32 having a lower planar surface 33 or is otherwise held together tightly to preclude separation and minimize "flash" during molding as for instance by hydraulic or other device 59, of Fig. 13. While maintaining flash minimizing pressure the piston 35 is forced axially downwardly upon the more or less deformable mass in the hopper 25, illustrated in Figs. 7 and 8, as by a hydraulic or the like cylinder 49, shown in Fig. 13. The mold cavity pressure produced by the piston must be less than the pressure exerted by pressure plate 32. The pressure exerted by the piston on the powder in the mold cavities fuses and/or solidifies and/or polymerizes the entire column of plastic in the mold cavities and sprue channels. This is facilitated by rapidly chilling all of the parts while maintaining both plate and piston pressure. In some cases there may be a very thin flash 43 formed between the mold halves joining the molded articles 42 as indicated in Fig. 9, but this is usually of no moment and in many cases will be non-existent. To this end it is only necessary to have properly complemental meeting faces for the parts and to make certain that the pressure from plate 32 on the mold halves in assembled relation is of a value greater than that in the mold cavities produced by piston 35.

It will be clear that the mold is readily disassembled and the completely molded article easily stripped off, and the articles easily stripped from the waste gates and sprues.

An illustration of a molded article has been given but it will be clearly evident that other and different articles can be molded by the molds and processes disclosed herein. Thus it will be clear that a single shaded charge may be used if an article of a single uniform visual aspect is desired. It will also be clear that in charging the molds it is not necessary that all charging particles enter the mold units through the sprue channels, as some parts might be placed in given mold recesses before they are closed by the complemental mold piece and thereafter the charging could proceed as disclosed. It will also be evident that it is not essential that all of the molding materials be in the form of powder, as it is contemplated that various liquids and syrups can also be charged in the mold cavities by the method and means illustrated. Finally it will also be clear that the range of materials that can be used is infinite, and includes not only any of the thermo-setting or thermo-plastic materials but mixtures thereof with materials which cannot be so designated, or powdered metals or the like may be used.

The advantages and economies of the invention are thought to be obvious.

I claim as my invention:

1. The method of molding utilizing a mold having a mold cavity, a passage communicating therewith and a reservoir bore which comprises feeding powdered plastic molding material into the reservoir bore, subjecting the powdered plastic material in the reservoir bore to force to transfer it from the reservoir bore through the passage and into the mold cavity, continuing the force while continuing the feeding to the reservoir bore until a compact column of powdered plastic molding material is disposed in the mold cavity and passage, feeding additional plastic material to the reservoir bore to form a termination for said column in the reservoir bore, plasticizing the column of molding material, then subjecting the plasticized material in the mold cavity to molding pressures by compression of the material in the reservoir bore by force separate and independent of the force for transferring the unplasticized material into the mold cavity.

2. In molding artificial teeth with at least two visually contrasting predetermined portions in a mold cavity of a mold having a charging reservoir bore and a sprue channel communicating with the mold cavity and bore, the method which comprises passing plastic material which is to form one predetermined portion of such tooth into the charging reservoir bore, transferring said plastic material by force from the reservoir bore into the mold cavity through said sprue channel, disposing the said material properly in the mold cavity to cause it to be properly shaped therein by said force, continuing to introduce plastic material into said reservoir bore and continuing the transfer of said plastic material into the mold cavity by said force from said reservoir bore through the sprue channel while changing from one material to the second visually contrasting material, continuing to shape the material in the mold cavity by said force while continuing the charging of the mold cavity with said second material alone, thus blending the materials, continuing to pass plastic molding material into the reservoir and transferring it by said force into the sprue channel and continuing to pass plastic molding material into said reservoir to form a mass of plastic material which is continuous from the mold cavity through the sprue channel and into the reservoir bore, heating the entire column of plastic material in situ in the mold cavity sprue channel and reservoir to plasticize it for subsequent molding by compression, and finally molding the plasticized column by compressing the plasticized material in the reservoir bore by force independent and separate from the force used for said transfers.

3. In molding artificial teeth with at least two visually contrasting predetermined portions utilizing a mold including a reservoir, a sprue channel and a mold cavity, the method which comprises passing a first plastic material into said reservoir, transferring the first plastic material by force from the reservoir through the sprue channel into the mold cavity and by the same force shaping the material in the mold cavity so as to define substantially the predetermined proportions and visual aspect of one portion of the ultimate molded tooth, then passing a second plastic material into the reservoir, transferring the second material from the reservoir by the same force through the sprue channel into the mold cavity to impart to the ultimate molded tooth the predetermined proportions and visual aspect desired relative to the first material, in a compact body of plastic molding material in the mold cavity, heating the compact body of plastic molding material in situ in the mold cavity to plasticize and to condition it for molding by compression, and subjecting the plasticized body in the mold cavity to compressive force separate and independent from the said transfer force.

4. In molding, the method of charging a closed mold cavity having a sprue channel and a bore reservoir, with visually contrasting materials, which comprises introducing material to the mouth of the sprue channel in the bore, subjecting the material to centrifugal force such as to position the material in the proper portions of the mold cavity to establish one proportionate part of the finished article, introducing visually contrasting material to the mouth of the sprue channel in the bore and subjecting it to centrifugal force such as to dispose it in the mold cavity in proper proportional relation in the finished article, filling the sprue channel with molding material, heating the mold to plasticize the entire mass of molding material, and molding by subjecting the plasticized mass in the bore to pressure in a line transverse of the centrifugal force.

5. In molding, the method of charging a closed mold cavity having a sprue channel and a bore reservoir, with visually contrasting materials, which comprises introducing one material to the mouth of the sprue channel in the bore, subjecting the material to force such as to position the material in the proper portions of the mold cavity to establish one proportionate part of the finished article, introducing into the sprue channel and subjecting to force blending material having some of the characteristics of both the said visually contrasting materials so as to dispose same in contacting relation to the initial predeterminedly positioned part in the mold cavities, introducing into the sprue channel and subjecting to force the second contrasting material alone, so as to dispose same in contacting relation to the blending material, introducing molding material to the mouth of the sprue channel in the bore and subjecting same to force to fill the sprue channel, introducing molding material to the bore reservoir to at least partially fill same, plasticizing the material in situ in the mold cavity sprue channel and bore reservoir, then molding the entire body of plasticized material by pressure on the material in the bore reservoir.

6. The method of charging a closed artificial tooth mold cavity having a sprue channel and a reservoir in which the sprue channel has a mouth, which comprises introducing incisal molding material to the entrance of the sprue channel, rotating the mold about an axis in the reservoir to subject said incisal tip material to centrifugal force such as to move it into the mold cavity to dispose it in the incisal tip as well as to dispose it for the formation of part at least of the labial surface of such tooth, blending the incisal tip material into enamel material of contrasting visual aspect and introducing the blended materials to the mouth of the sprue channel while continuing the rotation of the mold to move the blended materials through the sprue channel into the mold cavity by subjecting it to centrifugal force to cause it to overlie the previously disposed incisal tip material, while still continuing the rotation of the mold introducing enamel material to the mouth of the sprue channel and subjecting it to centrifugal force such as to cause it to enter the mold cavity and be shaped therein to compact behind the incisal tip and blended material in the incisal tip and also along the labial face, continuing the rotation of the mold while introducing molding material to the mouth of the sprue channel and moving it into the sprue channel by centrifugal force, charging the reservoir with molding material, plasticizing the material in the mold cavity sprue channel and reservoir so as to render it susceptible to molding by pressure, and subjecting the plasticized mass of molding material to molding pressures by compressing the material in the bore in a direction transverse of the centrifugal force.

7. The method of charging a mold cavity for teeth having an incisal tip and which is closed except for a sprue channel entering the mold cavity remote from the incisal tip molding portion thereof and which has a reservoir bore in communication with such sprue channel, which comprises disposing at the mouth of the sprue channel a succession of plastic materials of visually contrasting nature, in continuously subjecting the materials to centrifugal force to cause them to pass through the sprue channel and into the mold cavity and to cause them to be shaped and proportioned in the mold cavity, the plastic materials passing gradually from incisal tip material to enamel material during maintenance of the force, and said force being effective to compact the successive shaped materials in the mold cavity and sprue channel, charging the bore reservoir with molding material, heating the compacted and shaped material until it becomes responsive to compression for molding, then compressing the entire mass of heated material.

8. The method of molding an artificial tooth in a two part mold having a mold cavity having a sprue channel as its only entrance and with a charging reservoir, which consists in charging the reservoir with molding material, by centrifugal force charging the mold cavity and shaping therein successive visually contrasting materials from the charge in the reservoir by centrifugal force, in charging the sprue channel and at least partially additionally charging the reservoir to form a more or less continuous column of molding material from the mold cavity through the sprue channel into the reservoir, heating the column of material until it becomes responsive to compression, compressing the entire column by pressure in the reservoir and maintaining the pressure while permitting the column to cool.

9. The method of molding an artificial tooth which comprises charging a column of molding material from a reservoir by passing it by centrifugal force through a sprue into a two piece mold having a mold cavity having a parting between the two pieces of said mold, disposing material in the mold cavity by centrifugal force to establish at least two visually contrasting portions, heating the material of the column to render it capable of consolidation under pressure, pressing the two pieces together to reduce flash at the parting, and while maintaining flash-reducing pressure subjecting the entire column to a solidifying pressure in the reservoir separate and independent of the pressure exerted by centrifugal force and maintaining the said separate and independent pressure while the column cools, then separating the mold and stripping the molded column and teeth from the mold, then separating the teeth.

10. In molding in a separable mold defining a mold cavity a sprue channel and a reservoir, the method of molding which consists in feeding relatively uncompacted dry powdered plastic molding material to the reservoir, in subjecting the material in the reservoir to a force to cause it to pass from the reservoir through the sprue channel and into the mold cavity, in continuing the feeding while maintaining the force until the mold cavity and sprue channel are filled with relatively compacted dry powder, heating the compact dry powder in the mold cavity sprue channel and reservoir in situ to plasticize same to render it susceptible to molding by compression, and molding the plasticized mass by pressure thereon separate and independent from the said force.

11. The method of molding utilizing a mold provided with sprue channels and molding cavities in which the charging reservoir communicates with the mold cavities by means of sprue channels, which comprises feeding dry thermoplastic molding material in powdered form to the charging reservoir, subjecting the mold to rotation to develop centrifugal force on the dry powder to cause some of it to pass laterally out of the reservoir through the sprue channels and into mold cavities and to be compacted in columnar form in the mold cavities and sprue channels, heating the mold to transform the dry powder into a partially plasticized mass in columnar form terminating in the reservoir, and exerting pressure on the terminal portion of the mass in the reservoir in a direction substantially at right angles to the direction of the centrifugal force to compress the plastic mass in the mold.

12. The method of molding artificial teeth in a separable mold having a plurality of tooth mold cavities of relatively different volumetric capacities and proportionate effective entrance sizes to form teeth of relatively different sizes each having two visually contrasted predetermined portions which are proportionately similar in teeth of relatively different sizes, which comprises feeding two successive visually relatively different charges of dry powdered molding material to the entrances to the respective mold cavities, moving the particles of the charges successively to the mold cavities and shaping them therein by mechanical force while automatically varying the rate of inflow to the respective mold cavities to proportion the respectively visually different charges in the respective mold cavities of the plurality to fill the respective mold cavities.

13. The method of molding artificial teeth in a separable mold having a pair of mold cavities of respectively different mold capacities with sprue channels of respectively different effective widths leading from a common reservoir to the respective cavities in order to form teeth of relatively different sizes each having a plurality of visually contrasted predetermined portions which are proportionately similar in teeth of said relatively different sizes, which comprises feeding plastic molding material to the reservoir adjacent the mouths of the respective sprue channels in a plurality of successive visually contrasting charges, passing respectively different amounts of each successive charge of molding material by force from the reservoir to the respective mold cavities predetermined by the different effective widths of the associated sprue channels, and shaping the respective predetermined amounts in the respective mold cavities by the same force.

14. The method of molding in a separable mold having a pair of mold cavities of respectively different mold capacities with sprue channels of respectively different effective widths leading from a common reservoir to the respective cavities, which comprises feeding molding material to the reservoir adjacent the mouths of the respective sprue channels, passing a predeterminedly different amount of molding material by centrifugal force from the reservoir to each of the respective mold cavities, shaping the respective predetermined amounts in the respective mold cavities by centrifugal force, feeding a second molding material to the reservoir adjacent the mouths of the respective sprue channels, and passing predeterminedly different amounts of the second molding material to and shaping it in the respective mold cavities by centrifugal force to charge all of the mold cavities with proper proportionate parts of both materials regardless of relative sizes of the mold cavities, feeding molding material to the reservoir adjacent to the mouths of the sprue channels in the reservoir, and filling the sprue channels therewith by centrifugal force, feeding molding material to the reservoir, heating the mold to plasticise the molding material, then compressing the material in the reservoir axially thereof transverse to the direction of centrifugal force generated about the axis of the reservoir to complete the molding of the material in the mold cavities, sprue channels and reservoir.

15. The method of differentially charging a pair of tooth mold cavities of different sizes having a common reservoir and proportionate but differently sized entrances into the mold cavities from the reservoir, which comprises feeding dry powdered molding material to the common reservoir in successive visually contrasting charges and selectively delivering predeterminedly different amounts of each charge of the fed material to the respective mold cavities to fill both cavities to form a pair of teeth of different sizes and each formed of a plurality of proportionately similar visually contrasting portions.

16. A separable mold for artificial teeth comprising a mold formed of a plurality of pieces, means defining in the mold a pair of mold cavities of which one has a greater volumetric capacity than the other, a common charging reservoir, sprue channels in communication with the charging reservoir and with the respective mold cavities of the pair, the respective sprue channels having different effective widths so as to proportion shaded material passing through the sprue channels from the reservoir to the respective mold cavities in accordance with the proportionate capacities of the latter, means for depositing successive charges of shaded molding material in the reservoir in position to pass through the respective sprue channels in respectively proportioned amounts, and means for successively transferring said charges of material through the respective sprue channels to the respective mold cavities.

17. A separable mold for artificial teeth comprising a mold formed effectively of a plurality of separate pieces defining in assembly a mold cavity, a charging reservoir, and a sprue channel in communication with both the mold cavity and charging reservoir, said charging reservoir being arranged to receive plastic molding material, means for transferring molding material from the reservoir to the mold cavities, the whole being so arranged as to enable the charging of the mold cavity from the the reservoir to form a solid column of molding material in the mold cavity, sprue channel and mold cavity, means for heating the solid column of plastic material to plasticize same to condition the material for molding by compression, piston means independent of and separate from the means for transferring arranged to be forced into said reservoir against the plasticized molding material in the reservoir and so arranged as to subject the entire column of material in the mold cavity, sprue channel and reservoir to molding pressure.

18. A separable mold for artificial teeth comprising a mold formed effectively of a plurality of separate pieces defining in assembly a mold cavity, a charging reservoir arranged to receive plastic molding material, and a sprue channel in communication with both the mold cavity and charging reservoir, means for transferring plastic molding material from the reservoir and for secuing lodgement of the transferred molding material in the cavity so arranged as to enable the charging of the mold cavity from the reservoir to form a solid column of molding material in the mold cavity, sprue channel and reservoir, means operative after the formation of said solid column in the mold in assembly for compressing the mold to force the pieces together during molding, means for plasticizing the solid column, and a piston arranged to be forced against the molding material column in the mold cavity, sprue channel and reservoir to develop molding pressure thereon.

19. A mold for artificial teeth formed in part at least of initially substantially powdered plastic material comprising a plurality of pieces of metal arranged for juxtapositioning in assembly to form a mold having a common vertical axis, said pieces including a lower piece having an upwardly presenting surface provided with a plurality of mold recesses arranged generally radially of the common axis of the mold in a series concentric therewith, the upper of the pieces having an axial reservoir bore, generally radial sprue channels formed in the downwardly presenting surface thereof in communication with the bore, and complemental mold recesses forming with the recesses in the lower piece mold cavities communicating with the sprue channels, said mold cavities being disposed below the level of the reservoir axially of the assembled mold and said sprue channels being inclined relatively to the radial of said common axis so that powdered plastic material disposed in front of the entrances to the sprue channels in the reservoir bore will travel gravitationally into the respective mold cavities, said reservoir being arranged to receive molding material, means for plasticizing the compacted columns of powdered material to condition it for molding by compression, and piston means operative in the bore after the said columns have been formed for compressing the material in the bore to exert molding pressure on the columns.

20. In molds, separable means having a common axis defining a mold having a central molding-material reservoir substantially concentric with the axis, a plurality of generally radial mold cavities, a plurality of sprue channels connecting the respective mold cavities and the reservoir, means for rotating the mold about its said common axis to subject material in the reservoir to force urging it into the sprue channels and mold cavities, said reservoir arranged to receive molding material during such rotation, and piston means separate from and operated after the mold rotation has been effective to fill the mold cavities for subjecting the material remaining in the reservoir and that disposed in the sprue channels and mold cavities to molding pressure.

21. A separable mold for visually shaped artificial teeth comprising a mold formed of a plurality of pieces, means defining in the mold a pair of mold cavities of which one has a greater volumetric capacity than the other to form a larger shaded tooth than is formed in said other, a common charging reservoir, sprue channels in communication with the charging reservoir and with the respective mold cavities of the pair, the respective sprue channels having different effective widths so as to predeterminedly proportion shaded material passing through the sprue channels from the reservoir to the respective mold cavities, means for delivering dry plastic molding material in successive visually constrasting charges to the reservoir, and means for rotating the mold to cause portions of the successive charges in the common charging reservoir to pass through the respective sprue channels and to proportion material of the successive charges in the respective mold cavities.

22. A separable mold for artificial teeth comprising a mold formed of a plurality of pieces, means defining in the mold a pair of mold cavities of which one has a greater volumetric capacity than the other to form a larger shaded tooth than is formed in said other, a common charging reservoir, sprue channels in communication with and extending generally radially of the charging reservoir and in communication with the respective mold cavities of the pair, the respective sprue channels having different effective widths so as to predeterminedly proportion shaded material passing through the sprue channels from the reservoir to the respective mold cavities, means for depositing successive charges of respectively differently shaded molding material in the reservoir in position to pass through the respective sprue channels in respectively proportioned amounts, and means for rotating the mold to cause material in the common charging reservoir to pass through the respective sprue channels and to proportion material in the respective mold cavities.

23. A molding apparatus for molding plastic material into artificial teeth comprising a plurality of separate mold pieces arranged in assembly to form a mold having a compression reservoir bore, a plurality of tooth mold cavities spaced from the bore and a plurality of sprue channels extending respectively between the bore and the respective mold cavities, a piston arranged for relative movement into and for compressing action in said bore and for relative withdrawal from said bore in the assembled condition of said mold, said bore being arranged to receive plastic molding material, means for rotating the mold in assembly to subject the material in the bore to centrifugal force to urge molding material through the sprue channels and into the mold cavities to form closely compacted columns of material extending from the mold cavities through the sprue channels and to termination in a mass of molding material in the bore while maintaining the mold in assembly, means for plasticizing the material of the said compacted columns while the mold remains in assembly to condition the material for final molding by pressure, and means for relatively moving the piston and bore of the mold in assembly to compress the mass within the bore and thus to subject the plasticized columns in the sprue channels and mold cavities to molding pressures.

24. A molding apparatus for molding plastic material into artificial teeth comprising a plurality of separate mold pieces arranged in assembly to form a mold having a compression reservoir bore, a plurality of tooth mold cavities spaced from the bore and a plurality of sprue channels extending respectively between the bore and the respective mold cavities, a piston arranged for relative movement into and for compressing action in said bore and for relative withdrawal from said bore in the assembled condition of said mold, said bore being arranged to receive plastic molding material, means for rotating the mold in assembly to subject molding material in the bore to centrifugal force to urge molding material through the sprue channels and into the mold cavities to form closely compacted columns of material extending from the mold cavities through the sprue channels and to termination in a mass of molding material in the bore while maintaining the mold in assembly, means for plasticizing the material of the said compacted columns while the mold remains in assembly to condition the material for final molding by pressure, means for subjecting the mold in assembly to pressure to prevent separation thereof during application of pressure upon the plasticized columns, and means for relatively moving the piston and bore of the mold in assembly to compress the mass within the bore and thus to subject the plasticized columns in the sprue channels and mold cavities to molding pressures while still maintaining the mold in assembly and during the maintenance of said separating-preventing pressure thereon.

25. A molding apparatus for molding plastic material into artificial teeth comprising a plurality of separate mold pieces arranged in assembly to form a mold having a compression reservoir bore, a plurality of tooth mold cavities spaced from the bore and a plurality of sprue channels extending respectively between the bore and the respective mold cavities, the upwardly presenting portions of the respective mold cavities forming the labial surfaces and the surfaces of the respective mold cavities remote from the bore forming the incisal portions of the ultimate respective molded teeth, a piston arranged for relative movement into and for compressing action in said bore in the mold in assembly, means for charging the bore with incisal tip plastic molding material in the mold in assembly, means for rotating the mold in assembly at selective speeds to subject the material with which the bore is charged to substantially predetermined centrifugal force whereby the incisal tip material is urged through the sprue channels and into the mold cavities in which it is disposed adjacent to the mold surface forming the incisal surfaces and partially at least by gravity upon the mold surface forming the labial surfaces of said mold cavities, said molding means also being arranged to charge the bore with differently shaded plastic material, said rotative means being arranged to subject the last mentioned shaded material to substantially predetermined centrifugal force to cause the last mentioned plastic material to pass through the sprue channels and into the mold cavities to disposition behind the material at the incisal tip and to overlie the incisal tip material on the labial surfaces of the said mold cavities by gravity while maintaining the mold in assembly, said charging means also being arranged to charge the bore with additional amounts of plastic molding material, the rotative means being operable to develop substantially predetermined centrifugal force to cause the plastic material in the bore to pass by centrifugal force into and to complete the filling of the mold cavities and to fill the sprue channels by centrifugal force to form closely compacted columns of molding material extending from the incisal surfaces of the mold cavities through the sprue channels to termination in a mass in the bore, means for plasticizing the entire mass of material, and means for relatively moving the piston and the bore of the mold in assembly to compress the mass in the bore and thus to subject the plasticized columns to molding pressures while still maintaining the mold in assembly.

FRED A. SLACK, Jr.

(References on following page)

REFERENCES CITED

The following references are of record in the file of this patent:

UNITED STATES PATENTS

| Number | Name | Date |
|---|---|---|
| 1,153,126 | Long | Sept. 7, 1915 |
| 1,768,254 | Hoy | June 24, 1930 |
| 1,961,942 | Pack | June 5, 1934 |
| 1,964,687 | May | June 26, 1934 |
| 2,196,258 | Erdle | Apr. 9, 1940 |
| 2,333,059 | Tucker | Oct. 26, 1934 |
| 2,345,305 | Thornton | Mar. 28, 1944 |
| 2,377,128 | Burgess | May 29, 1945 |

FOREIGN PATENTS

| Number | Country | Date |
|---|---|---|
| 198,417 | Switzerland | Sept. 1, 1938 |
| 357,992 | Great Britain | Sept. 24, 1931 |
| 437,337 | Germany | Mar. 22, 1925 |
| 514,830 | Great Britain | Nov. 20, 1939 |
| 837,831 | France | Feb. 21, 1939 |

OTHER REFERENCES

Powder Metallurgy, J. Wulff, 1942. Copy in Div. 3, page 255.